United States Patent
Miyazaki

(10) Patent No.: US 12,527,541 B2
(45) Date of Patent: Jan. 20, 2026

(54) X-RAY CT SCANNER, DATA ACQUISITION SYSTEM, AND DATA ACQUISITION METHOD

(71) Applicant: CANON MEDICAL SYSTEMS CORPORATION, Otawara (JP)

(72) Inventor: Hiroaki Miyazaki, Otawara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 135 days.

(21) Appl. No.: 18/359,282

(22) Filed: Jul. 26, 2023

(65) Prior Publication Data

US 2024/0032884 A1 Feb. 1, 2024

(30) Foreign Application Priority Data

Jul. 28, 2022 (JP) .................. 2022-120139

(51) Int. Cl.
*A61B 6/58* (2024.01)
*A61B 6/03* (2006.01)
*A61B 6/42* (2024.01)
*A61B 6/46* (2024.01)

(52) U.S. Cl.
CPC .............. *A61B 6/586* (2013.01); *A61B 6/032* (2013.01); *A61B 6/4241* (2013.01); *A61B 6/465* (2013.01)

(58) Field of Classification Search
CPC ....... A61B 6/032; A61B 6/4241; A61B 6/465; A61B 6/586
See application file for complete search history.

(56) References Cited

U.S. PATENT DOCUMENTS

| | | | | |
|---|---|---|---|---|
| 4,178,510 A | * | 12/1979 | Wagner .................. | A61B 6/586 378/98 |
| 5,025,463 A | * | 6/1991 | Saito ...................... | A61B 6/032 378/19 |
| 5,712,890 A | * | 1/1998 | Spivey ................... | A61B 6/502 378/98.2 |
| 6,041,097 A | * | 3/2000 | Roos ...................... | A61B 6/032 378/19 |
| 6,157,696 A | * | 12/2000 | Saito ..................... | A61B 6/5205 378/19 |
| 6,201,249 B1 | * | 3/2001 | Yamayoshi .......... | A61B 6/4494 250/370.11 |
| 6,512,217 B1 | * | 1/2003 | Kameshima ........... | H04N 25/68 348/300 |
| 6,642,494 B1 | * | 11/2003 | Endo ..................... | H04N 23/30 250/214.1 |

(Continued)

FOREIGN PATENT DOCUMENTS

JP 2018-42604 A 3/2018

*Primary Examiner* — Blake C Riddick
(74) *Attorney, Agent, or Firm* — Oblon, McClelland, Maier & Neustadt, L.L.P.

(57) ABSTRACT

An X-ray CT scanner includes a photon counting type detector and processing circuitry. The detector includes a plurality of detection elements. The processing circuitry determines whether there is a defective element out of the plurality of detection elements and interpolates an output value of a defective element on the basis of output values of a plurality of normal elements which are included in the plurality of detection elements and which are adjacent to a defective element when there is a defective element.

13 Claims, 7 Drawing Sheets

(56) References Cited

U.S. PATENT DOCUMENTS

| | | | |
|---|---|---|---|
| 6,693,668 B1* | 2/2004 | May | H04N 17/002 |
| | | | 348/E5.081 |
| 6,697,663 B1* | 2/2004 | Lin | A61B 6/032 |
| | | | 378/22 |
| 6,819,359 B1* | 11/2004 | Oda | H04N 25/68 |
| | | | 348/E5.081 |
| 6,961,478 B2* | 11/2005 | Inoue | G06T 5/20 |
| | | | 382/284 |
| 8,854,448 B2* | 10/2014 | Tsujimoto | H04N 7/18 |
| | | | 348/79 |
| 9,295,437 B2* | 3/2016 | Saito | A61B 6/035 |
| 9,693,745 B2* | 7/2017 | Teshigawara | A61B 6/032 |
| 10,001,568 B2* | 6/2018 | Teshigawara | A61B 6/4266 |
| 10,140,686 B2* | 11/2018 | Kobayashi | G06T 5/77 |
| 10,448,914 B2* | 10/2019 | Spahn | A61B 6/4241 |
| 10,861,197 B2* | 12/2020 | Kobayashi | G06T 7/149 |
| 2002/0141255 A1* | 10/2002 | Inoue | G06T 5/50 |
| | | | 365/200 |
| 2005/0243967 A1* | 11/2005 | Inoue | H05G 1/44 |
| | | | 378/97 |
| 2007/0019847 A1* | 1/2007 | Inoue | G06T 5/70 |
| | | | 382/128 |
| 2008/0298541 A1* | 12/2008 | Mattson | A61B 6/585 |
| | | | 378/19 |
| 2009/0230312 A1* | 9/2009 | Tashiro | G01T 1/20184 |
| | | | 250/370.11 |
| 2010/0054416 A1* | 3/2010 | Tsubota | G01T 1/2019 |
| | | | 378/98 |
| 2010/0150421 A1* | 6/2010 | Nakanishi | A61B 6/4085 |
| | | | 378/4 |
| 2011/0075909 A1* | 3/2011 | Kanagawa | A61B 6/586 |
| | | | 378/4 |
| 2012/0018641 A1* | 1/2012 | Watanabe | A61B 6/4233 |
| | | | 250/354.1 |
| 2012/0241629 A1* | 9/2012 | Kuwabara | A61B 6/4291 |
| | | | 250/362 |
| 2012/0305791 A1* | 12/2012 | Watanabe | G01T 1/208 |
| | | | 250/394 |
| 2013/0136234 A1* | 5/2013 | Noma | H04N 25/671 |
| | | | 378/91 |
| 2013/0182823 A1* | 7/2013 | Kuwabara | A61B 6/542 |
| | | | 378/91 |
| 2014/0010353 A1* | 1/2014 | Lalena | A61B 6/465 |
| | | | 378/207 |
| 2015/0071414 A1* | 3/2015 | Oda | A61B 6/467 |
| | | | 378/207 |
| 2015/0078528 A1* | 3/2015 | Okada | A61B 6/542 |
| | | | 378/97 |
| 2015/0245805 A1* | 9/2015 | Nakatsugawa | A61B 6/4233 |
| | | | 250/394 |
| 2015/0363926 A1* | 12/2015 | Enomoto | A61B 6/5205 |
| | | | 382/132 |
| 2016/0015351 A1* | 1/2016 | Konno | G06T 7/0012 |
| | | | 378/62 |
| 2016/0306053 A1* | 10/2016 | Steadman Booker | A61B 6/032 |
| 2017/0119340 A1* | 5/2017 | Nakai | A61B 6/50 |
| 2018/0031714 A1* | 2/2018 | Tajima | A61B 6/4233 |
| 2018/0211417 A1* | 7/2018 | Miyazaki | G01N 23/046 |
| 2019/0029628 A1* | 1/2019 | Konno | A61B 6/542 |
| 2019/0231299 A1* | 8/2019 | Lalena | A61B 6/465 |
| 2020/0037967 A1* | 2/2020 | Nishijima | A61B 6/4233 |
| 2020/0096654 A1* | 3/2020 | Saito | G01T 1/2018 |
| 2020/0289081 A1* | 9/2020 | Arai | G01T 7/005 |
| 2020/0323502 A1 | 10/2020 | Kojima et al. | |
| 2020/0330065 A1* | 10/2020 | Zhan | A61B 6/4035 |
| 2021/0219930 A1* | 7/2021 | Tsuchiya | A61B 6/4241 |
| 2023/0165550 A1* | 6/2023 | Shimizukawa | A61B 6/542 |
| | | | 378/62 |

* cited by examiner

X-RAY CT SCANNER, DATA ACQUISITION SYSTEM, AND DATA ACQUISITION METHOD

CROSS-REFERENCE TO RELATED APPLICATION

The present application claims priority based on Japanese Patent Application No. 2022-120139 filed on Jul. 28, 2022, the contents of which are incorporated herein by reference.

FIELD

An embodiment disclosed in the present specification and the drawings relates to an X-ray CT (Computed Tomography) scanner, a data acquisition system, and a data acquisition method.

BACKGROUND

A photon counting computed tomography (CT) scanner is a diagnostic imaging device that can discriminate a detection target material having transmitted X-rays using a direct detector such as a semiconductor detector with an excellent energy resolution. In the photon counting CT scanner, data detected by a detector is collected for each energy band (hereinafter also referred to as an "energy bin").

DETAILED DESCRIPTION

Hereinafter, an X-ray CT scanner, a data acquisition system, and a data acquisition method according to an embodiment will be described with reference to the accompanying drawings. The X-ray CT scanner according to this embodiment includes a photon counting type detector and processing circuitry. The detector includes a plurality of detection elements. The processing circuit determines whether there is a defective element out of the plurality of detection elements. When there is a defective element, the processing circuitry interpolates an output value of a defective element on the basis of output values of a plurality of normal elements which are included in the plurality of detection elements and which are adjacent to the defective element. In this way, by interpolating an output value of a defective element using output values of normal elements, it is possible to generate a high-precision medical image.

The X-ray CT scanner according to this embodiment is a photon counting CT scanner. The photon counting CT scanner discriminates a detection target material having transmitted X-rays using a direct detector. The X-ray CT scanner according to the embodiment includes several imaging modes. The imaging modes include, for example, a material discrimination mode in which a material can be discriminated and a counting mode in which a material is not discriminated like an X-ray CT scanner according to the related art. Details of an interpolation process which will be described later are changed according to the imaging modes.

[Configuration of X-Ray CT Scanner]

Figure 1:
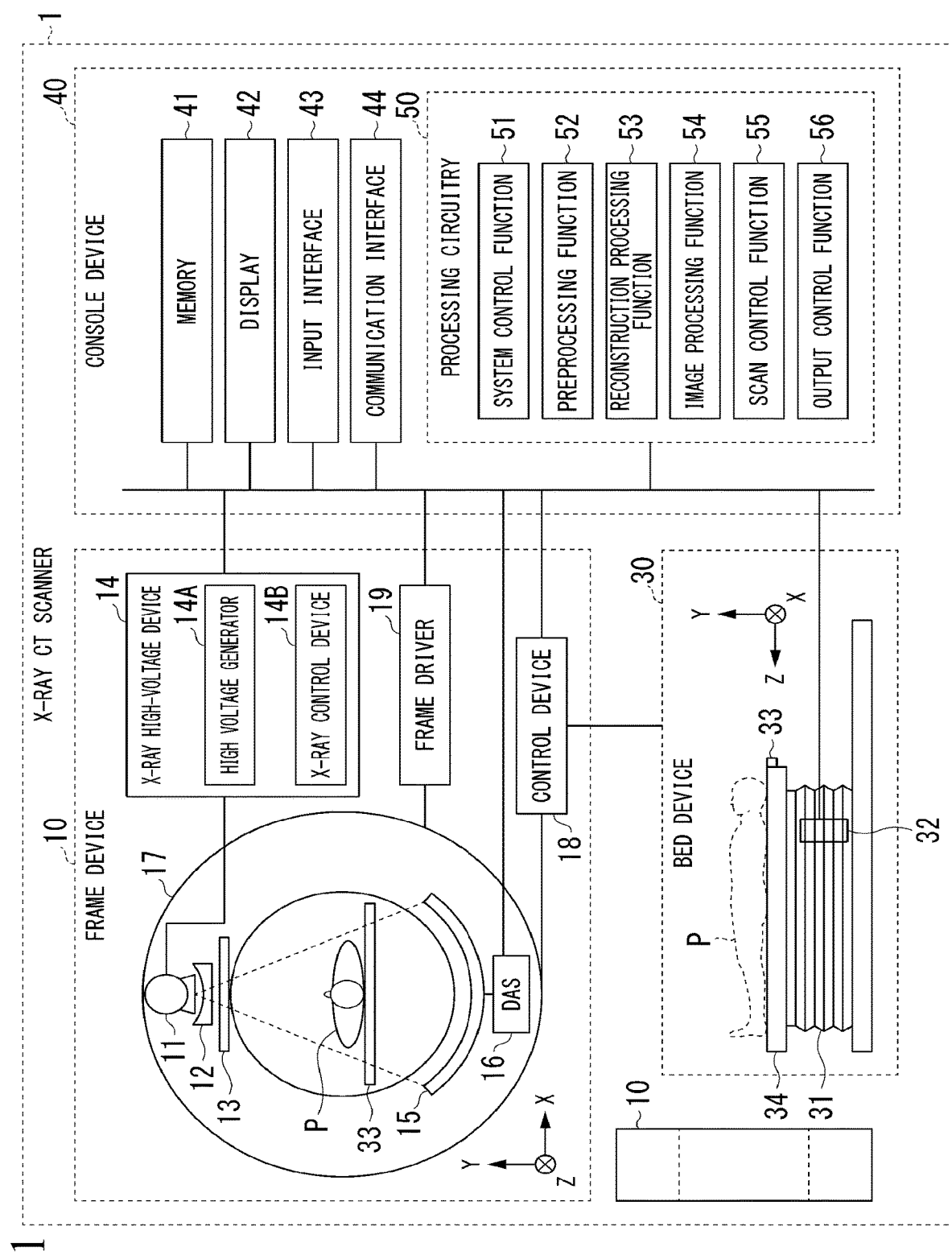
FIG. 1 is a diagram illustrating an example of a configuration of an X-ray CT scanner according to an embodiment.

FIG. 1 is a diagram illustrating an example of a configuration of an X-ray CT scanner 1 according to the embodiment. The X-ray CT scanner 1 includes, for example, a frame device 10, a bed device 30, and a console device 40. In FIG. 1, both a view of the frame device 10 when seen in a Z-axis direction and a view of the frame device 10 when seen in an X-axis direction are illustrated, but the actual number of frame devices 10 is one. In this embodiment, a rotation shaft of a rotary frame 17 in a non-tilted state or a longitudinal direction of a top plate 33 of the bed device 30 is defined as a Z-axis direction, a direction perpendicular to the Z-axis direction and parallel to the floor is defined as an X-axis direction, and a direction perpendicular to the Z-axis direction and perpendicular to the floor is defined as a Y-axis direction.

The frame device 10 includes, for example, an X-ray tube 11, a wedge 12, a collimator 13, an X-ray high-voltage device 14, an X-ray detector 15, a data acquisition system (hereinafter referred to as a DAS) 16, a rotary frame 17, a control device 18, and a frame driving device 19. The rotary frame 17 holds the X-ray tube 11 and the X-ray detector 15 such that they are rotatable.

The X-ray tube 11 generates X-rays by radiating thermoelectrons from a cathode (a filament) to an anode (a target) with application of a high voltage from the X-ray high-voltage device 14. The X-ray tube 11 includes a vacuum tube. For example, the X-ray tube 11 is a rotary anode type X-ray tube that generates X-rays by radiating thermoelectrons to the rotating anode.

The wedge 12 is a filter for adjusting an X-ray dose radiated from the X-ray tube 11 to a sample P. The wedge 12 attenuates X-rays transmitted by the wedge such that a distribution of an X-ray dose radiated from the X-ray tube 11 to the sample P becomes a predetermined distribution. The wedge 12 is also referred to as a wedge filter or bow-tie filter. The wedge 12 is formed, for example, by processing aluminum to have a predetermined target angle or a predetermined thickness.

The collimator 13 is a mechanism for narrowing an irradiation range with X-rays transmitted by the wedge 12. The collimator 13 narrows the irradiation range with X-rays, for example, by forming a slit in combination of a plurality of lead plates. The collimator 13 may be referred to as an X-ray iris diaphragm. The narrowing range of the collimator 13 may be mechanically driven.

The X-ray high-voltage device 14 includes for example, a high voltage generator 14A and an X-ray control device 14B. The high voltage generator 14A includes an electrical circuit including a voltage transformer and a current rectifier and generates a high voltage which is applied to the X-ray tube 11. The high voltage generator 14A may perform step-up using the voltage transformer or may perform step-up using an inverter.

The X-ray control device 14B includes, for example, processing circuitry including a processor such as a central processing unit (CPU). The X-ray control device 14B receives an input signal from an input interface attached to the console device 40 or the frame device 10 and controls operations of the collimator 13 and the high voltage generator 14A. The X-ray control device 14B adjusts the irradiation range with X-rays by controlling the collimator 13. The X-ray control device 14B controls an output voltage of the high voltage generator 14A, for example, according to an X-ray dose to be generated by the X-ray tube 11. The X-ray high-voltage device 14 may be provided in the rotary frame 17 or may be provided in a fixed frame (not illustrated) of the frame device 10.

The X-ray detector 15 detects an intensity of X-rays which are generated by the X-ray tube 11, pass through a sample P, and are incident thereon. The X-ray detector 15 outputs an electrical signal (which may be an optical signal) corresponding to the detected intensity of X-rays to the DAS 16. The X-ray detector 15 includes, for example, a plurality of X-ray detection element lines. In each of the plurality of X-ray detection element lines, a plurality of X-ray detection elements are arranged in a channel direction along an arc centered on the focal point of the X-ray tube 11. The plurality of X-ray detection element lines are arranged in sliced directions (a column direction, a row direction).

The X-ray detector 15 is, for example, a direct detection type detector. For example, a semiconductor diode in which electrodes are attached to both ends of a semiconductor can be used as the X-ray detector 15. Photons of X-rays incident on the semiconductor are converted to electron-hole pairs. The number of electron-hole pairs which are generated in response to incidence of one X-ray photon depends on an energy of the incident X-ray photon. Electrons and holes are attracted to a pair of electrodes formed at both ends of the semiconductor. The pair of electrodes generate electrical pulses having a peak value corresponding to electric charges of the electron-hole pairs. One electrical pulse has a peak value corresponding to an energy of the incident X-ray photons. The X-ray detector 15 is an example of a "photon counting type detector."

Figure 2:
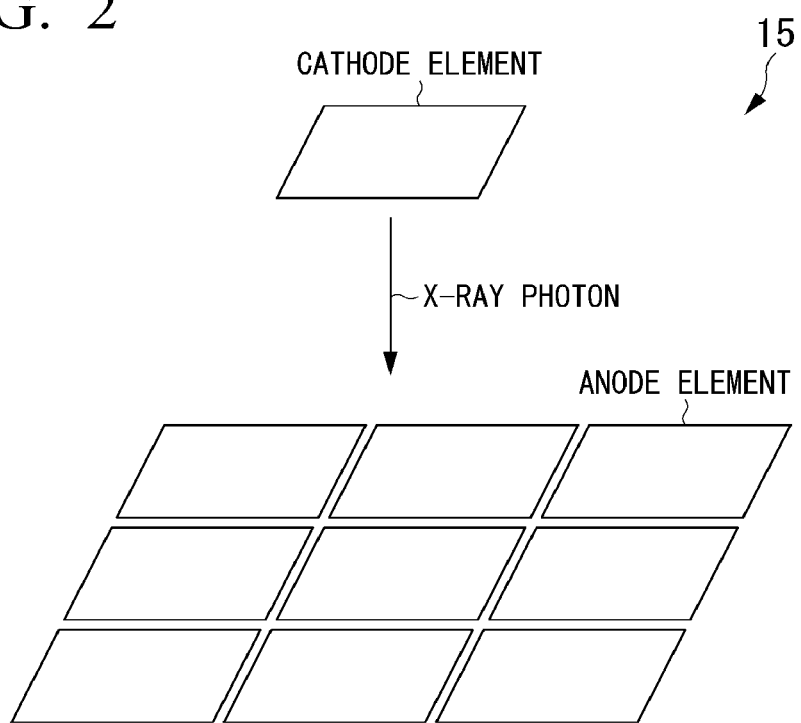
FIG. 2 is a diagram illustrating an example of a configuration of an X-ray detector according to the embodiment.

FIG. 2 is a diagram illustrating an example of a configuration of the X-ray detector 15 according to the embodiment. For example, in a semiconductor diode used as the X-ray detector 15, a plurality of anode elements (9 anode elements in the illustrated example) are arranged on pixels for one cathode element. When X-ray photons are incident on the semiconductor via the cathode element, electron-hole pairs are generated and electrical pulses are detected via the anode elements. In this embodiment, when one of the plurality of anode elements (X-ray detection elements) is defective, an output value of a defective X-ray detection element (hereinafter referred to as a defective element) is interpolated using output values of the other X-ray detection elements which are not defective (hereinafter referred to as normal elements). Details of this interpolation process will be described later.

The description will be continued with reference back to FIG. 1. For example, the DAS 16 acquires count data indicating the counted number of X-ray photons detected by the X-ray detector 15 for each energy bin in accordance with a control signal from the control device 18. The count data for each energy bin corresponds to an energy spectrum for X-rays incident on the X-ray detector 15 and deformed according to response characteristics of the X-ray detector 15. The DAS 16 outputs detection data based on a digital signal to the console device 40. The detection data includes a digital value of the count data identified by a channel number and a line number of the X-ray detection element which is a source and a view number indicating a collected view. The view number is a number changing with rotation of the rotary frame 17 and is, for example, a number increasing with rotation of the rotary frame 17. Accordingly, the view number is information indicating a rotational angle of the X-ray tube 11. A view period is a period required for the rotary frame 17 to rotate from a rotational angle corresponding to a certain view number to a rotational angle corresponding to a next view number. The DAS 16 may detect switching a view on the basis of a timing signal input from the control device 18, using an internal timer, or on the basis of a signal acquired from a sensor which is not illustrated. When X-rays are continuously radiated by the X-ray tube 11 in full scanning, the DAS 16 collects a detection data group corresponding to a full circumference (360 degrees). When X-rays are continuously radiated by the X-ray tube 11 in half scanning, the DAS 16 collects detection data corresponding to a half circumference (180 degrees).

Figure 3:
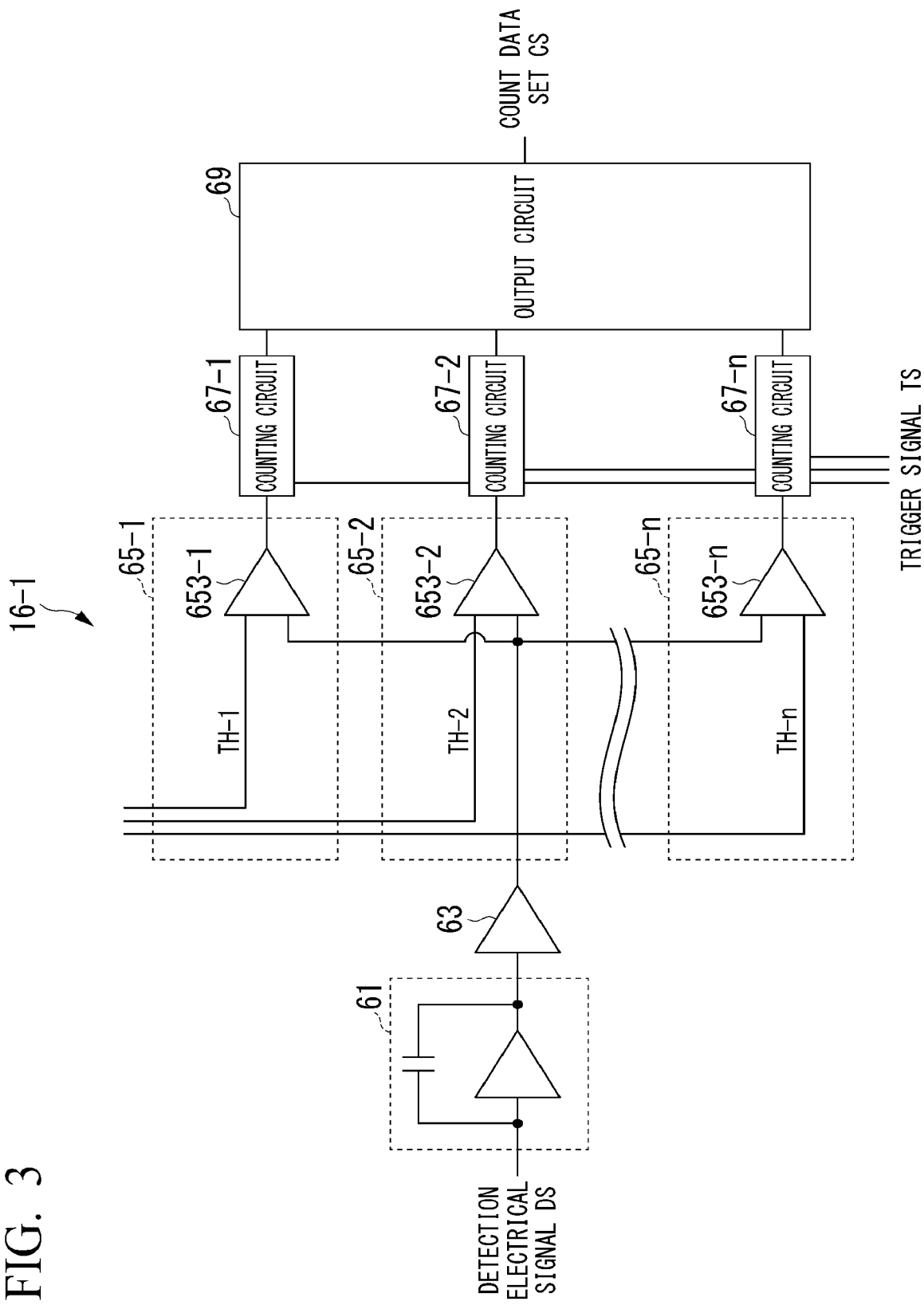
FIG. 3 is a diagram illustrating an example of a configuration of a DAS according to the embodiment.

FIG. 3 is a diagram illustrating an example of a configuration of the DAS 16 according to the embodiment. The DAS 16 includes reading channels corresponding to the number of channels based on the number of X-ray detection elements. The plurality of reading channels are mounted in parallel in an integrated circuit such as an application-specific integrated circuit (ASIC). In FIG. 3, only the configuration of the DAS 16-1 corresponding to one reading channel is illustrated.

The DAS 16-1 includes a preamplifier circuit 61, a waveform shaping circuit 63, a plurality of peak discriminating circuits 65, a plurality of counting circuits 67, and an output circuit 69. The preamplifier circuit 61 amplifies a detection electrical signal DS (a current signal) from an X-ray detection element which is a connection destination. For example, the preamplifier circuit 61 converts the current signal from the X-ray detection element which is a connection destination to a voltage signal having a voltage value (a peak value) proportional to the amount of electric charges of the current signal. The waveform shaping circuit 63 is connected to the preamplifier circuit 61. The waveform shaping circuit 63 shapes a waveform of the voltage signal from the preamplifier circuit 61. For example, the waveform shaping circuit 63 decreases a pulse width of the voltage signal from the preamplifier circuit 61.

A plurality of counting channels corresponding to the number of energy bands (energy bins) are connected to the waveform shaping circuit 63. When n energy bins are set, n counting channels are provided in the waveform shaping circuit 63. Each counting channel includes a peak discriminating circuit 65-$n$ and a counting circuit 67-$n$ Each peak discriminating circuit 65-$n$ discriminates energies of X-ray photons which are detected by the X-ray detection element and which is a peak value of a voltage signal from the waveform shaping circuit 63. For example, the peak discriminating circuit 65-$n$ includes a comparison circuit 653-$n$. A voltage signal from the waveform shaping circuit 63 is input to one input terminal of each comparison circuit 653-$n$. A reference signal TH (a reference voltage value) corresponding to another threshold value is supplied to the other input terminal of the comparison circuit 653-$n$ from the control device 18. For example, a reference signal TH-1 is supplied to the comparison circuit 653-1 for an energy bin bin1, a reference signal TH-2 is supplied to the comparison circuit 653-2 for an energy bin bin2, and a reference signal TH-n is supplied to the comparison circuit 653-$n$ for an energy bin binn. Each reference signal TH includes an upper-limit reference value and a lower-limit reference value. When the voltage signal from the waveform shaping circuit 63 has a peak value corresponding to the energy bin corresponding to the reference signal TH, each comparison circuit 653-$n$ outputs an electrical pulse signal. For example, when the peak value of the voltage signal from the waveform shaping circuit 63 is a peak value corresponding to the energy bin bin1 (when the peak value is between the reference signal TH-1 and the reference signal TH-2), the comparison circuit 653-1 outputs an electrical pulse signal. On the other hand, when the peak value of the voltage signal from the waveform shaping circuit 63 is not a peak value corresponding to the energy bin bin1, the comparison circuit 653-1 for the energy bin bin1 does not output an electrical pulse signal. For example, when the peak value of the voltage signal from the waveform shaping circuit 63 is a peak value corresponding to the energy bin bin2 (when the peak value is between the reference signal TH-2 and the reference signal TH-3), the comparison circuit 653-2 outputs an electric pulse signal.

The counting circuit 67-$n$ counts the electrical pulse signal from the peak discriminating circuit 65-$n$ in a reading cycle corresponding to a view switching period. For example, the counting circuit 67-$n$ is supplied with a trigger signal TS from the control device 18 at each view switching timing. With supply of the trigger signal TS as a trigger, the counting circuit 67-$n$ adds 1 to the count number stored in an internal memory whenever an electrical pulse signal is input from the peak discriminating circuit With next supply of the trigger signal as a trigger, the counting circuit 67-$n$ reads data of the count number (that is, count data) stored in the internal memory and supplies the count data to the output circuit 69. The counting circuit 67-$n$ resets the count number stored in the internal memory to an initial value whenever the trigger signal TS is supplied. In this way, the counting circuit 67-$n$ counts the count number for each view.

The output circuit 69 is connected to the counting circuits 67-$n$ corresponding to a plurality of reading channels mounted in the X-ray detector 15. The output circuit 69 collects count data from the counting circuits 67-$n$ corresponding to the plurality of reading channels for each of the plurality of energy bins and generates count data corresponding to the plurality of reading channels for each view. The count data for each energy bin is a set of data of the count number defined by the channels, the segments (lines), and the energy bin. The count data for each energy bin is transmitted to the console device 40 for each view. The count data for each view is referred to as a count data set CS.

The rotary frame 17 is an arc-shaped member supporting the X-ray tube 11, the wedge 12, and the collimator 13 and the X-ray detector 15 such that they face each other. The rotary frame 17 is supported to be rotatable about a sample P introduced thereinto by a fixed frame. The rotary frame 17 additionally supports the DAS 16. Detection data output from the DAS 16 is transmitted from a transmitter including a light emitting diode (LED) provided in the rotary frame 17 to a receiver including a photo diode provided in a non-rotary part (for example, the fixed frame) of the frame device 10 by optical communication and is transmitted to the console device 40 by the receiver. The method of transmitting detection data from the rotary frame 17 to the non-rotary part is not limited to the method using optical communication, and a non-contact arbitrary transmission method may be employed. The rotary frame 17 is not limited to the arc-shaped member as long as it can support and rotate the X-ray tube 11 and the like and may be a member an arm-like member.

The X-ray CT scanner 1 is, for example, a rotate/rotate-type X-ray CT scanner (a third-generation CT) in which both the X-ray tube 11 and the X-ray detector 15 are supported by the rotary frame 17 and rotate around a sample P, but it is not limited thereto and may be a stationary/rotate-type X-ray CT scanner (a fourth-generation CT) in which a plurality of X-ray detection elements arranged in an arc shape are fixed to a fixed frame and the X-ray tube 11 rotates around a sample P.

The control device 18 includes, for example, processing circuitry including a processor such as a central processing unit (CPU). The control device 18 receives an input signal from an input interface attached to the console device 40 or the frame device 10 and controls operations of the frame device 10, the bed device 30, and the DAS 16. For example, the control device 18 controls a frame driving device 19 such that the rotary frame 17 is rotated or the frame device 10 is tilted. When the frame device 10 is tilted, the control device 18 controls the frame driving device 19 on the basis of a tilt angle input to the input interface such that the rotary frame 17 is rotated about an axis parallel to the Z-axis direction. The control device 18 ascertains a rotation angle of the rotary frame 17 on the basis of an output of a sensor which is not illustrated or the like. The control device 18 frequently sends the rotation angle of the rotary frame 17 to a scanning control function 55. The control device 18 controls an energy bin (a reference signal TH) of the DAS 16. The control device 18 may be provided in the frame device 10 or may be provided in the console device 40.

The frame driving device 19 includes, for example, a motor or an actuator. For example, the frame driving device 19 rotates the rotary frame 17 or tilts the frame device 10. The frame driving device 19 rotates the rotary frame 17 of the frame device 10 on the basis of a tilt angle input to the input interface or a rotation instruction from the processing circuitry 50.

The bed device 30 is a device which allows a sample P which is a scanning target to be placed thereon and to move and introduces the sample P into the rotary frame 17 of the frame device 10. The bed device 30 includes, for example, a base 31, a bed driving device 32, a top plate 33, and a support frame 34. The base 31 includes a casing that supports a support frame 34 to be movable in the vertical direction (the Y-axis direction). The bed driving device 32 includes a motor or an actuator. The bed driving device 32 moves the top plate 33 in the longitudinal direction (the Z-axis direction) of the top plate 33 along the support frame 34. The bed driving device 32 moves the top plate 33 in the vertical direction (the Y-axis direction). The top plate 33 is a plate-shaped member on which a sample P is placed.

The bed driving device 32 may move the support frame 34 in addition to the top plate 33 in the longitudinal direction of the top plate 33. On the other hand, the frame device 10 may be movable in the Z-axis direction and control may be performed such that the rotary frame 17 approaches a sample P with movement of the frame device 10. Both the frame device 10 and the top plate 33 may be configured to be movable. The X-ray CT scanner 1 may be a device of a type in which a sample P is scanned in an upright position or a sitting position. In this case, the X-ray CT scanner 1 includes a sample support mechanism instead of the bed device 30, and the frame device 10 rotates the rotary frame 17 about an axis direction perpendicular to the bottom.

The console device 40 includes, for example, a memory 41, a display 42, an input interface 43, a communication interface 44, and processing circuitry 50. In this embodiment, the console device 40 is provided separate from the frame device 10, but some or all of constituents of the console device 40 may be included in the frame device 10.

The memory 41 is realized, for example, by a semiconductor memory device such as a random access memory (RAM) or a flash memory, hard disk, and an optical disc. The memory 41 stores, for example, detection data, projection data, reconstruction image data, CT images, information on a sample P, and imaging conditions. The memory 41 stores, for example, count data of a plurality of energy bins transmitted from the frame device 10. Such data may be stored in an external memory that can communicate with the X-ray CT scanner 1 instead of the memory 41 (or in addition to the memory 41). The external memory is controlled, for example, by a cloud server managing the external memory by causing the cloud server to receive a reading/writing request.

The display 42 displays various types of information. For example, the display 42 displays a medical image (a CT image) generated by the processing circuitry or a graphical user interface (GUI) image for receiving various operations from an operator such as a doctor or an engineer. The display 42 is, for example, a liquid crystal display, a cathode ray tube (CRT), or an organic electroluminescence (EL) display. The display 42 may be provided in the frame device 10. The display 42 may be a desktop or may be a display device (for example, a tablet terminal) that can wirelessly communicate with a main body part of the console device 40.

The input interface 43 receives various input operations from an operator and outputs an electrical signal indicating details of the received input operation to the processing circuitry 50. For example, the input interface 43 receives an input operation of collection conditions for collecting detection data or projection data (which will be described later), reconstruction conditions for reconstructing a CT image, and image processing conditions for generating a post-processed image from the CT image. The input interface 43 receives an operation of selecting one imaging mode of the counting mode and the material discrimination mode.

For example, the input interface 43 may be realized by a mouse, a keyboard, a touch panel, a drag ball, a switch, a button, a joystick, a camera, an infrared sensor, or a microphone. The input interface 43 may be provided in the frame device 10. The input interface 43 may be realized by a display device (for example, a tablet terminal) that can wirelessly communicate with the main body part of the console device 40. The input interface in this specification is not limited to an input interface including physical operation components such as a mouse and a keyboard. For example, the input interface may be processing circuitry that receives an electrical signal corresponding to an input operation from an external input device provided separately from the device and outputs the electrical signal to a control circuit.

The communication interface 44 includes, for example, a network card including a printed circuit board or a wireless communication module. The communication interface 44 has an information communication protocol corresponding to a network type to be connected thereto.

The processing circuitry 50 controls the whole operations of the X-ray CT scanner 1, the operation of the frame device 10, and the operation of the bed device 30. The processing circuitry 50 performs, for example, a system control function 51, a preprocessing function 52, a reconstruction function 53, an image processing function 54, a scanning control function 55, and an output control function 56. The preprocessing function 52 is an example of a "determination unit" and/or an "interpolation unit."

These constituent elements are realized, for example, by causing a hardware processor (a computer) to execute a program (software) stored in the memory 41. The hardware processor means, for example, circuitry such as a CPU, a graphics processing unit (GPU), an application-specific integrated circuit (ASIC), a programmable logic device (for example, a sample programmable logic device (SPLD) or a complex programmable logic device (CPLD)), or a field-programmable gate array (FPGA). Instead of storing a program in the memory 41, the program may be directly assembled into circuitry of the hardware processor. In this case, the hardware processor realizes the functions by reading and executing the program assembled into the circuitry. The hardware processor is not limited to a single circuit, but a plurality of independent circuits may be combined into a single hardware processor to realize the functions. A plurality of constituent elements may be integrated into a single hardware processor to realize the functions.

The constituent elements of the console device 40 or the processing circuitry 50 may be realized by a plurality of pieces of hardware which are distributed. The processing circuitry 50 is not included in the console device 40, but may be realized by a processing device that can communicate with the console device 40. The processing device is, for example, a workstation connected to a single X-ray CT scanner or a device (for example, a cloud server) that is connected to a plurality of X-ray CT scanners and performs the same processing as the processing circuitry 50 which is described below in batch.

The system control function 51 controls various functions of the processing circuitry 50 on the basis of an input operation received by the input interface 43.

The preprocessing function 52 generates projection data by performing preprocessing such as a logarithmic transformation process, an offset correction process, an inter-channel sensitivity correction process, a beam hardening correction process, a scattered ray correction process, and a dark count correction process on detection data (count data) output from the DAS 16.

The reconstruction function 53 generates a photon counting CT image by performing a reconstruction process using a filter-correction reverse projection method or a successive approximation reconstruction method on the projection data generated by the preprocessing function 52. The reconstruction function 53 stores the reconstructed CT image in the memory 41. When the preprocessing has not been performed by the preprocessing function 52, the reconstruction function 53 may perform a reconstruction process using the detection data (count data).

Figure 4:
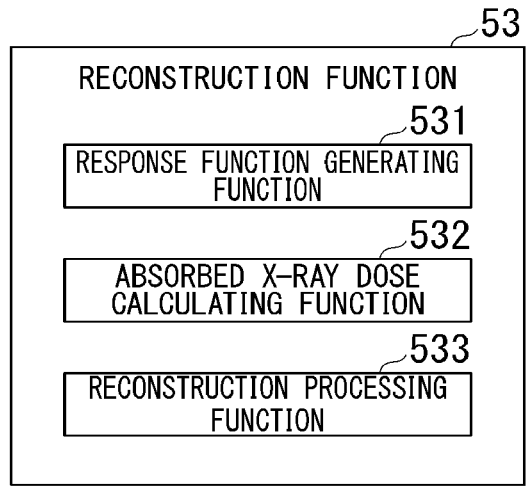
FIG. 4 is a diagram illustrating an example of functional blocks of a reconstruction function according to the embodiment.

FIG. 4 is a diagram illustrating an example of functional blocks of the reconstruction function 53 according to the embodiment. The reconstruction function 53 includes, for example, a response function generating function 531, an absorbed X-ray dose calculating function 532, and a reconstruction processing function 533. The response function generating function 531 generates data of a response function indicating detector response characteristics. For example, the response function generating function 531 measures a response (that is, detection energy and detection intensity) of a standard measuring system to a plurality of monochromic X-rays with a plurality of incident X-ray energy bins) by predicting calculation, experiment, and a combination of predicting calculation and experiment and generates a response function on the basis of measured values of the detection energy and the detection intensity. The response function generating function 531 may generate data of a response function on the basis of measured values collected in calibration or the like. The response function defines the relationship between detection energy for each incident X-ray and an output response of a system. For example, the response function defines the relationship between detection energy for each incident X-ray and a detection intensity. The generated data of the response function is stored in the memory 41.

The absorbed X-ray dose calculating function 532 calculates an absorbed X-ray dose for each of a plurality of base materials on the basis of count data on a plurality of energy bins included in the projection data, an energy spectrum of X-rays incident on a sample P, and the response function stored in the memory 41. The absorbed X-ray dose calculating function 532 can calculate an absorbed X-ray dose not affecting the response characteristics of the X-ray detector 15 and the DAS 16 by calculating an absorbed X-ray dose on the basis of the count data and the energy spectrum of X-rays incident on a sample P using the response function. The process of obtaining an absorbed X-ray dose for each base material in this way is also referred to as material discrimination. The type of the base material can be set to all materials such as calcium, calcification, bone, fat, muscle, air, internal organ, lesion, hard tissue, soft tissue, and contrast medium. The type of the base material which is a calculation target may be determined by an operator or the like using the input interface 43 in advance. The absorbed X-ray dose indicates an X-ray dose which is absorbed by the base material. For example, the absorbed X-ray dose is defined by a combination of an X-ray attenuation coefficient and an X-ray transmission path length.

The reconstruction processing function 533 reconstructs a photon counting CT image representing a spatial distribution of the base material to be imaged out of a plurality of base materials on the basis of the absorbed X-ray dose for each of the plurality of base materials calculated by the absorbed X-ray dose calculating function 532 and stores the generated CT image in the memory 41. The base material to be imaged may be one type or two or more types. The type of the base material to be imaged may be determined by an operator or the like using the input interface 43.

The projection data acquired by the photon counting CT scanner includes information of energy of X-rays attenuated by transmitting a sample P. Accordingly, the reconstruction processing function 533 can reconstruct, for example, a CT image of a specific energy component. The reconstruction processing function 533 can reconstruct, for example, a CT image of each of a plurality of energy components. For example, the reconstruction processing function 533 can allocate color tones corresponding to the energy components to pixels of the CT images of the energy components and overlap the plurality of CT images which are classified according to the energy component.

Description will be continued with reference back to FIG. 1. The image processing function 54 converts a CT image to a three-dimensional image or an arbitrary tomographic image using a known method on the basis of the input operation received by the input interface 43.

The scanning control function 55 controls a process of collecting detection data in the frame device 10 by instructing the X-ray high-voltage device 14, the DAS 16, the control device 18, the frame driving device 19, and the bed driving device 32. The scanning control function 55 controls operations of the constituent units when imaging for collecting positioning images and imaging for capturing an image used to diagnosis are performed.

The output control function 56 displays various images (such as a captured image, a positioning image, a GUI image, or a CT image) on the display 42 or transmits various images to an external device via the communication interface 44.

[Process Flow]

Figure 5:
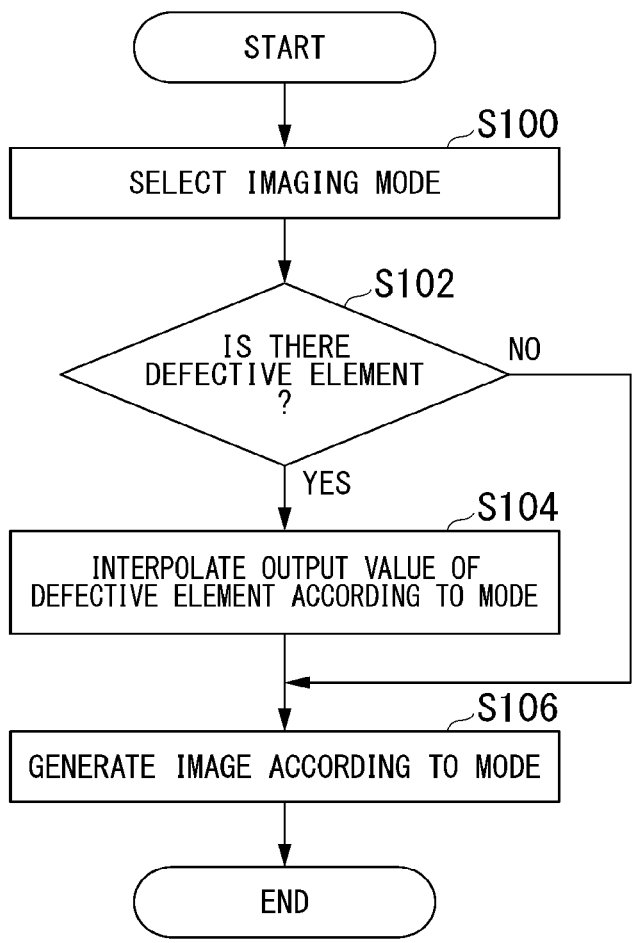
FIG. 5 is a flowchart illustrating a flow of a sequence of processes which are performed by the X-ray CT scanner according to the embodiment.

A flow of a series of processes which are performed by the X-ray CT scanner 1 according to the embodiment will be described below. FIG. 5 is a flowchart illustrating a flow of a series of processes which are performed by the X-ray CT scanner 1 according to the embodiment.

First, the system control function 51 selects an imaging mode of the X-ray CT scanner 1 on the basis of an input to the input interface 43 from an operator (Step S100).

Figure 6:
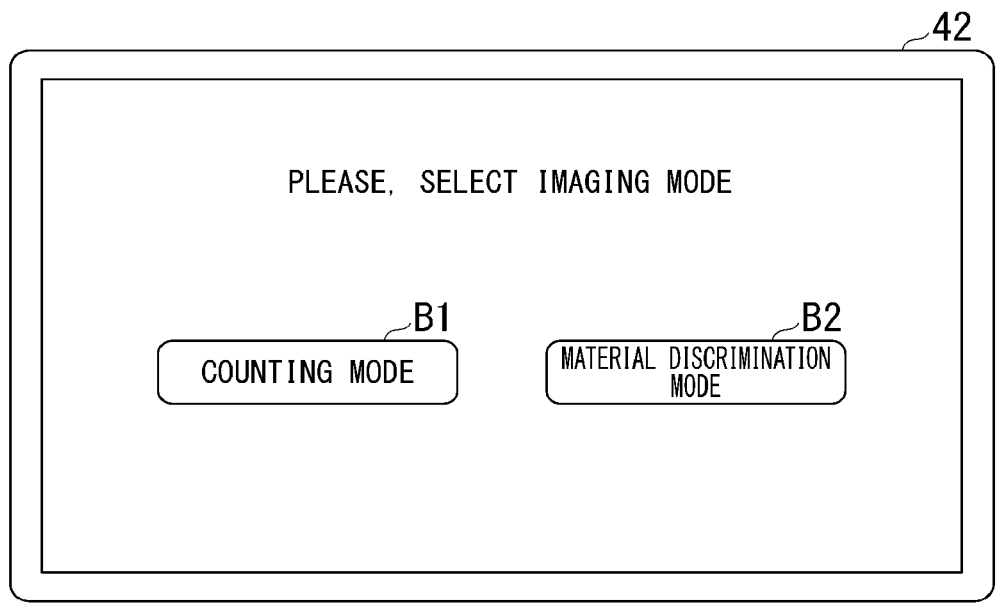
FIG. 6 is a diagram illustrating an example of a screen of a display.

FIG. 6 is a diagram illustrating an example of a screen of the display 42. A GUI in which an imaging mode can be selected is displayed on the display 42. A button B1 for selecting a counting mode as the imaging mode and a button B2 for selecting a material discrimination mode as the imaging mode are displayed in the GUI. For example, when an operator touches the button B1, the system control function 51 determines the imaging mode of the X-ray CT scanner 1 to be the counting mode. On the other hand, when an operator touches the button B2, the system control function 51 determines the imaging mode of the X-ray CT scanner 1 to be the material discrimination mode.

Then, the preprocessing function 52 determines whether there is a defective element in the plurality of X-ray detection elements included in the photon counting X-ray detector 15 (Step S102).

For example, the preprocessing function 52 may determine whether there is a defective element on the basis of the count data output for each reading channel of the DAS 16, that is, the count data for each X-ray detection element. For example, the preprocessing function 52 calculates an average value of the count data of the plurality of X-ray detection elements and calculates a difference between the value of the count data of each X-ray detection element and the average value. The preprocessing function 52 may determine an X-ray detection element with a count data value of which a difference from the average value is equal to or greater than a threshold value to be a defective element.

The preprocessing function 52 may determine an X-ray detection element with a count data value with which a base material cannot be discriminated to be a defective element.

The preprocessing function 52 may determine an X-ray detection element with an abnormal count data value with which a base material cannot be discriminated to be a defective element. More specifically, when a count data value of a specific energy bin is remarkably larger or smaller than a count data value of another energy bin, the preprocessing function 52 cannot discriminate a base material using even such an abnormal count value and thus determines an X-ray detection element with such an abnormal count data value to be a defective element.

When an operator selects a specific X-ray detection element as a defective element using the input interface 43, the preprocessing function 52 may determine the specific X-ray detection element selected by the operator to be a defective element.

When table data in which a flag indicating that it is a defective element or a flag indicating that it is not a defective element is correlated with an identifier (ID) of each of the plurality of X-ray detection elements is stored in advance in the memory 41, the preprocessing function 52 may determine a defective element on the basis of the table data stored in the memory 41.

Then, the preprocessing function 52 interpolates an output value, that is, the count data, of the defective element according to the imaging mode (Step S104). Details of the interpolation process will be described below with some of the drawings.

Figure 7:
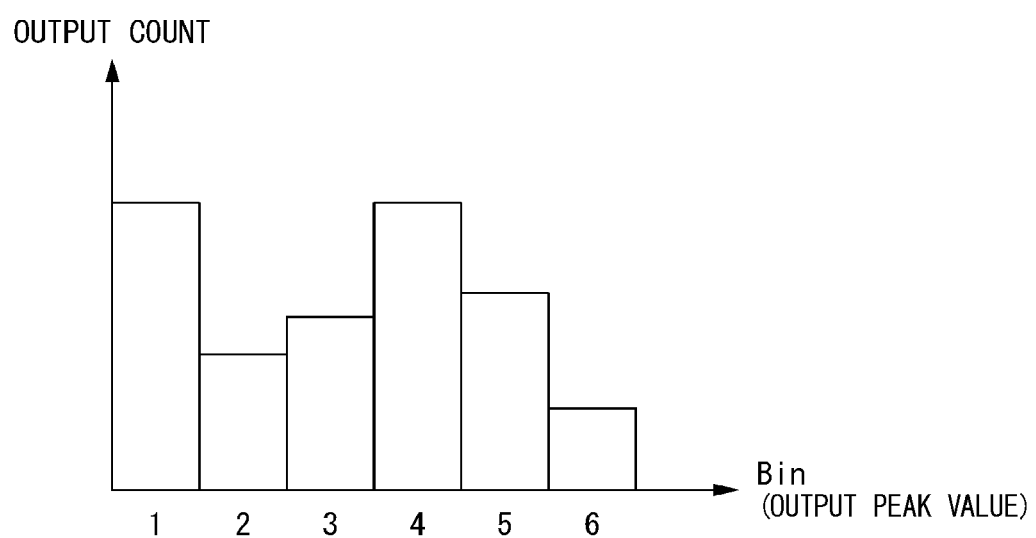
FIG. 7 is a diagram illustrating an example of count data for each energy bin output from a certain X-ray detection element.

FIG. 7 is a diagram illustrating an example of the count data for each energy bin output from a certain X-ray detection element. In the drawing, for example, the count data when six (n=6) energy bins are set is illustrated. In the following description, it is assumed that number of energy bins is six.

Figure 8:
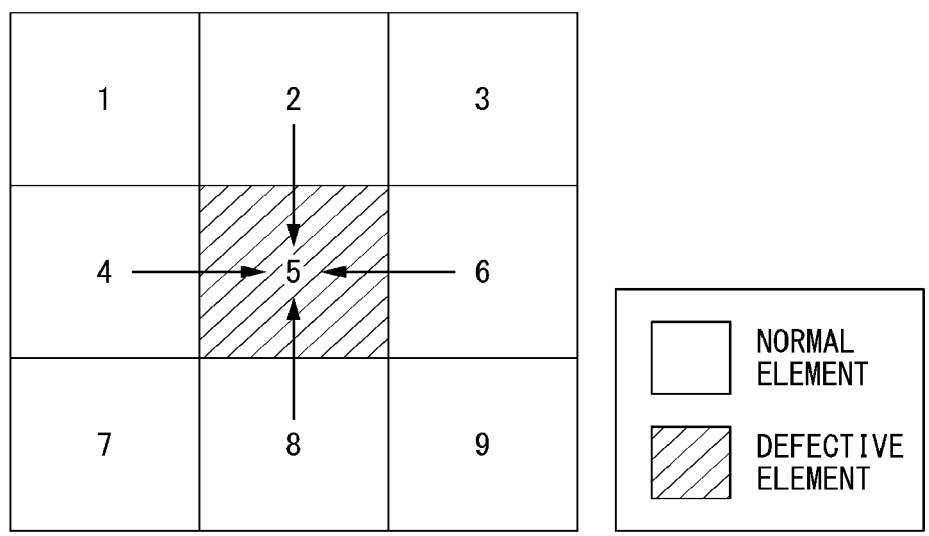
FIG. 8 is a diagram illustrating a method of interpolating an output value of a defective element.
Figure 9:
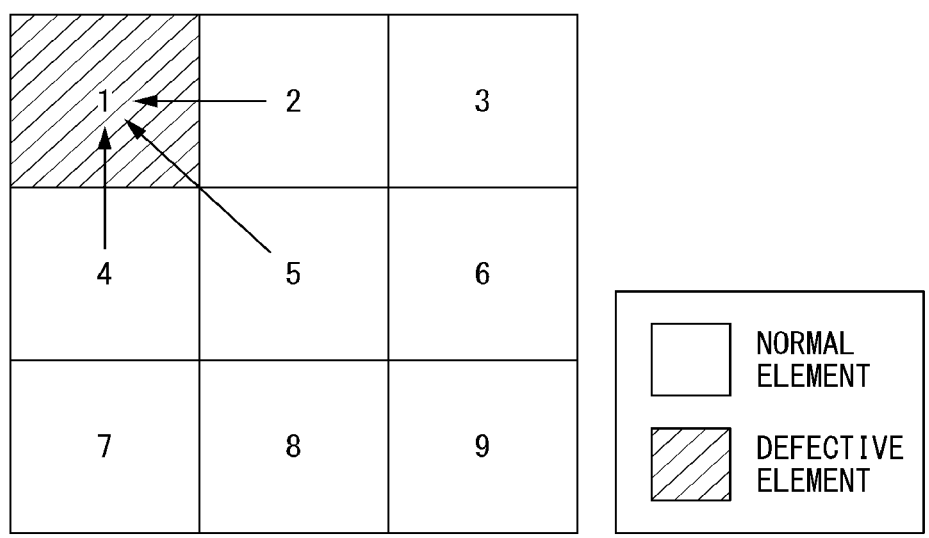
FIG. 9 is a diagram illustrating a method of interpolating an output value of a defective element.

FIGS. 8 and 9 are diagrams illustrating a method of interpolating an output value of a defective element. For the purpose of convenience, the X-ray detection elements from the left-upper corner in the drawing are sequentially numbered with 1, 2, 3, . . . , 9. In the example illustrated in FIG. 8, the fifth X-ray detection element at the center is a defective element, and the remaining eight X-ray detection elements are normal elements. In the example illustrated in FIG. 9, the first X-ray detection element at the uppermost-leftmost corner is a defective element, and the remaining eight X-ray detection elements are normal elements.

In the example illustrated in FIG. 8, the preprocessing function 52 interpolates count data of the defective element which is the fifth X-ray detection element using the count data of the normal elements which are the second, fourth, sixth, and eighth X-ray detection elements neighboring the defective element. Through broad analysis, the normal elements which are the first, third, seventh, and ninth X-ray detection elements may be handled as the normal elements neighboring the defective element.

In the example illustrated in FIG. 9, the preprocessing function 52 interpolates the count data of the defective element which is the first X-ray detection element using the count data of the normal elements which are the second, fourth, and fifth X-ray detection elements neighboring the defective element. Through broad analysis, the normal elements which are the third, sixth, seventh, eighth, and ninth X-ray detection elements may be handled as the normal elements neighboring the defective element.

[Interpolation Process in Counting Mode]

When the imaging mode is the counting mode, the preprocessing function 52 adds (sums) the count data of the plurality of normal elements for each of the sixth energy bins over the sixth energy bins and interpolates the count data of the defective element on the basis of the added count data (the summed count data).

Referring to FIG. 8, first, the preprocessing function 52 adds (sums) the count values of energy bins 1 to 6 for the normal element which is the second X-ray detection element. Similarly, the preprocessing function 52 adds (sums) the count values of energy bins 1 to 6 for the normal element which is the fourth X-ray detection element, adds (sums) the count values of energy bins 1 to 6 for the normal element which is the sixth X-ray detection element, and adds (sums) the count values of energy bins 1 to 6 for the normal element which is the eighth X-ray detection element. Then, the preprocessing function 52 averages the added value for the normal element which is the second X-ray detection element, the added value for the normal element which is the fourth X-ray detection element, the added value for the normal element which is the sixth X-ray detection element, and the added value for the normal element which is the eighth X-ray detection element and sets the average value as the count data of the defective element which is the fifth X-ray detection element.

The same is true of FIG. 9. First, the preprocessing function 52 adds (sums) the count values of energy bins 1 to 6 for the normal element which is the second X-ray detection element. Similarly, the preprocessing function 52 adds (sums) the count values of energy bins 1 to 6 for the normal element which is the fourth X-ray detection element and adds (sums) the count values of energy bins 1 to 6 for the normal element which is the fifth X-ray detection element. Then, the preprocessing function 52 averages the added value for the normal element which is the second X-ray detection element, the added value for the normal element which is the fourth X-ray detection element, and the added value for the normal element which is the fifth X-ray detection element and sets the average value as the count data of the defective element which is the first X-ray detection element.

The preprocessing function 52 may weight the count value of each energy bin on the basis of an energy value (a peak value) of each energy bin when the count values of the energy bins are added for each normal element.

In FIG. 7, the energy value (peak value) of energy bin 6 is higher than that of energy bin 1. For example, the weighting factor for the count value C1 of energy bin 1 is defined as W1, the weighting factor for the count value C2 of energy bin 2 is defined as W2, the weighting factor for the count value C3 of energy bin 3 is defined as W3, the weighting factor for the count value C4 of energy bin 4 is defined as W4, the weighting factor for the count value C5 of energy bin 5 is defined as W5, and the weighting factor for the count value C6 of energy bin 6 is defined as W6. In this case, the preprocessing function 52 determines the weighting factors such that the relationship of W1<W2<W3<W4<W5<W6 is satisfied. That is, the preprocessing function 52 sets the weighting factor for the count value of each energy bin to be greater as the energy value (peak value) of the corresponding energy bin becomes higher. When the weighting factors are determined, the preprocessing function 52 calculates a weighted average (W1C1+W2C2+ . . . W6C6)/(W1+W2+ . . . W6). The preprocessing function 52 calculates the weighted average for the normal elements neighboring the defective element. Then, the preprocessing function 52 additionally calculates the weighted average for all the normal elements neighboring the defective element and sets the average value as the count data of the defective element.

When the count values of the energy bins are added for each normal element and then the added values for all the normal elements are averaged, the preprocessing function 52 may weight the added values of the normal elements on the basis of distances between the defective element and the normal elements.

In FIG. 9, when the normal elements which are the third, sixth, seventh, eighth, and ninth X-ray detection elements in addition to the normal elements which are the second, fourth, and fifth X-ray detection elements are used as the normal elements neighboring the defective element which is the first X-ray detection element, the normal elements which are the third, sixth, seventh, eighth, and ninth X-ray detection elements are farther from the defective element which is the first X-ray detection element than the normal elements which are the second, fourth, and fifth X-ray detection elements. In this case, the preprocessing function 52 sets the weighting factor K1 for the added values of the count values for the normal elements which are the second, fourth, and fifth X-ray detection elements to be greater than the weighting factor K2 for the added values of the count values for the normal elements which are the third, sixth, seventh, eighth, and ninth X-ray detection elements. That is, the preprocessing function 52 sets the weighting factor for the added values of the count values for a normal element to be greater as the distance to the defective element becomes less.

[Interpolation Process in Material Discrimination Mode]

When the imaging mode is the material discrimination mode, the preprocessing function 52 interpolates the count data of the defective element on the basis of the count data of the normal elements over the sixth energy bins.

Referring to FIG. 8, first, the preprocessing function 52 adds (sums) the count value of energy bin 1 for the normal element which is the second X-ray detection element, the count value of energy bin 1 for the normal element which is the fourth X-ray detection element, the count value of energy bin 1 for the normal element which is the sixth X-ray detection element, and the count value of energy bin 1 for the normal element which is the eighth X-ray detection element. The preprocessing function 52 sets the added value (summed value) of the count values of energy bin 1 for the normal elements which are the second, fourth, sixth, and eighth X-ray detection elements as the count value of energy bin 1 for the defective element which is the fifth X-ray detection element.

The same is true of the other energy bins. For example, the preprocessing function 52 adds (sums) the count value of energy bin 2 for the normal element which is the second X-ray detection element, the count value of energy bin 2 for the normal element which is the fourth X-ray detection element, the count value of energy bin 2 for the normal element which is the sixth X-ray detection element, and the count value of energy bin 2 for the normal element which is the eighth X-ray detection element. The preprocessing function 52 sets the added value (summed value) of the count values of energy bin 2 for the normal elements which are the second, fourth, sixth, and eighth X-ray detection elements as the count value of energy bin 2 for the defective element which is the fifth X-ray detection element. In this way, the preprocessing function 52 interpolates all the count values of energy bins 1 to 6 for the defective element which is the fifth X-ray detection element.

When the count values of the normal elements are added for each energy bin, the preprocessing function 52 may weight the count values of the normal elements on the basis of distances between the normal elements and the defective element. For example, the preprocessing function 52 sets the weight factor for the count value of the normal elements to be greater as the distance to the defective element becomes less.

Description will be continued with reference back to the flowchart of FIG. 5. The preprocessing function 52 performs various types of preprocessing such as a logarithmic transformation process or an offset correction process on the interpolated count data of the defective element and the count data of the normal elements and generates projection data for image reconstruction.

Then, the reconstruction function 53 performs a reconstruction process corresponding to the imaging mode on the projection data generated by the preprocessing function 52 and generates a photon counting CT image (Step S106).

For example, when the imaging mode is the material discrimination mode, the reconstruction function 53 may extract only a component of a specific material (for example, calcium) from the projection data of each energy bin and generate a CT image including only the specific material by reconstructing the projection data of each energy bin from which the component of the specific material is extracted. For example, when the imaging mode is the counting mode, the reconstruction function 53 may generate a CT image including various materials by integrating and reconstructing the projection data of the energy bins. As a result, the process flow in the flowchart ends.

According to the aforementioned embodiment, the X-ray CT scanner 1 determines whether there is a defective element in a plurality of X-ray detection elements included in the photon counting X-ray detector 15. When there is a defective element, the X-ray CT scanner 1 interpolates the output value of the defective element on the basis of the output values of a plurality of normal elements neighboring the defective elements. Accordingly, it is possible to generate a high-precision CT image.

In the aforementioned embodiment, the X-ray CT scanner 1 adds (sums) the count data of a plurality of normal elements in each of a plurality of energy bins over the plurality of energy bins in the counting mode and interpolates the count data of a defective element on the basis of the added count data (the summed count data). Accordingly, it is not necessary to interpolate the count data in a plurality of energy bins in the counting mode, and it is possible to achieve simplification and increase in speed of processing.

In the aforementioned embodiment, the X-ray CT scanner 1 interpolates the count data of the defective element on the basis of the count data of the normal elements for each of the plurality of energy bins in the material discrimination mode. Accordingly, it is possible to improve a spatial resolution of an image after being discriminated in comparison with a case in which the summed value of all the energy bins is used. It is possible to cause the count data of the defective element for each energy bin to approach a more ideal value.

Other Embodiments

Other embodiments will be described below. In the aforementioned embodiment, the processing circuitry 50 of the console device 40 of the X-ray CT scanner 1 interpolates an output value of a defective element on the basis of output values of a plurality of normal elements, but the present disclosure is not limited thereto. For example, the data acquisition system (DAS) 16 may determine whether there is a defective element and interpolate the output value of the defective element on the basis of the output values of the plurality of normal elements.

Figure 10:
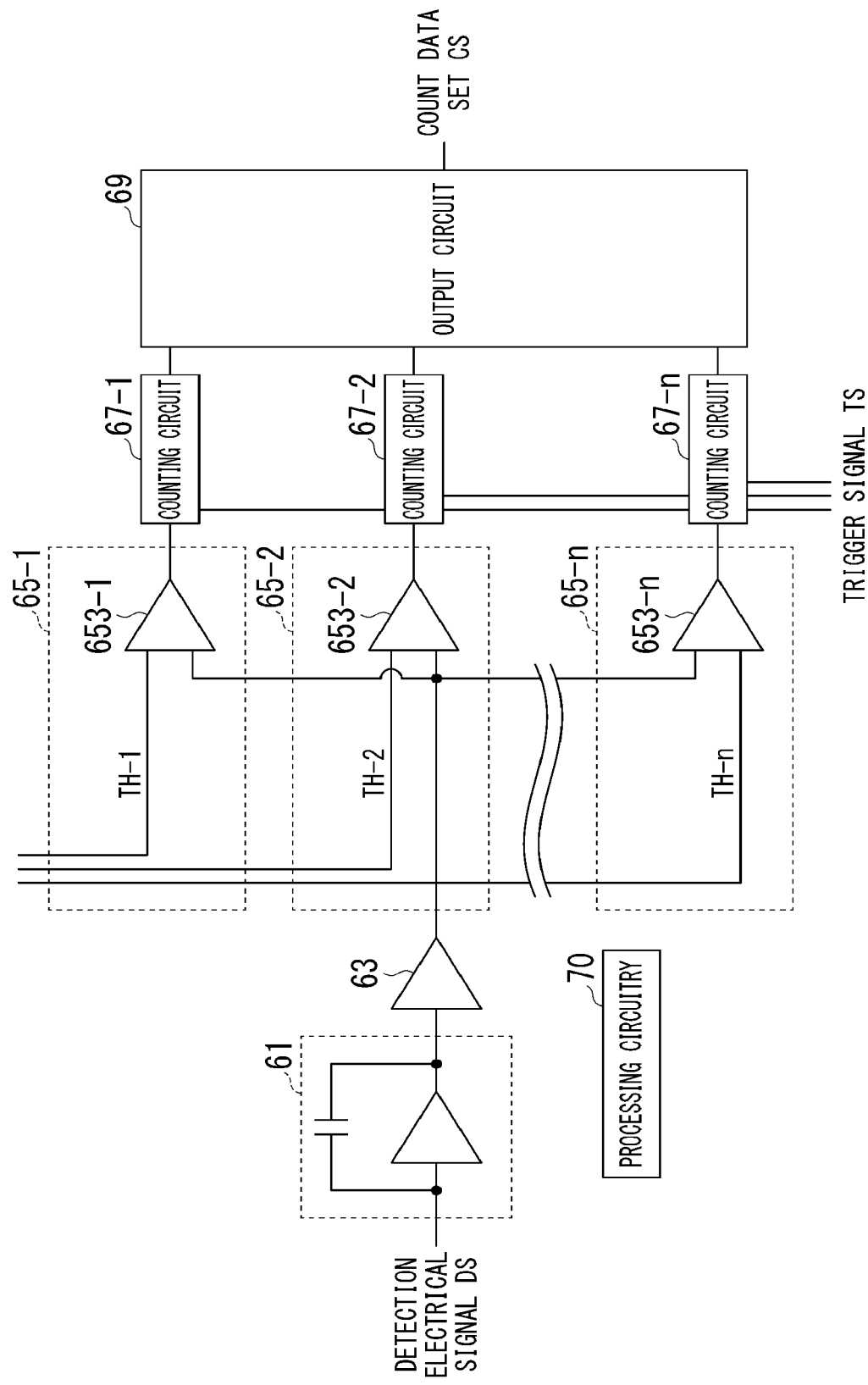
FIG. 10 is a diagram illustrating an example of a configuration of a DAS according to another embodiment.

FIG. 10 is a diagram illustrating an example of the configuration of the DAS 16 according to another embodiment. The DAS 16 according to the other embodiment includes processing circuitry 70 in addition to the preamplifier circuit 61, the waveform shaping circuit 63, a plurality of peak discriminating circuits 65, a plurality of counting circuits 67, and the output circuit 69.

The processing circuitry 70 has a function equivalent to the processing circuitry (particularly the preprocessing function 52) included in the console device 40 of the X-ray CT scanner 1. Specifically, the processing circuitry 70 determines whether there is a defective element in a plurality of X-ray detection elements included in the photon counting X-ray detector 15. Then, the processing circuitry 70 interpolates the output value, that is, the count data, of the defective element according to the imaging mode.

The processing circuitry 70 is, for example, a FPGA, but is not limited thereto and may be a CPU, a GPU, an ASIC, or a programmable logic device (for example, an SPLD or a CPLD).

While some embodiments have been described above, the embodiments are presented as only an example and are not intended to limit the scope of the invention. The embodiments can be modified in various other forms and various omissions, substitutions, and alterations can be performed thereto without departing from the gist of the invention. These embodiments or modifications thereof are included in the scope or gist of the invention and are included in the inventions described in the appended claims and scopes equivalent thereto.

What is claimed is:

1. An X-ray CT scanner, comprising:
   a photon counting detector including a plurality of anode elements;
   an input interface configured to allow a user to select an imaging mode; and
   processing circuitry configured to
      determine whether there is a defective anode element out of the plurality of anode elements, and
      interpolate an output value of the defective anode element based on output values of a plurality of normal elements that are included in the plurality of anode elements and adjacent to the defective anode element, when determining that there is the defective anode element,
   wherein the processing circuitry is further configured to interpolate the output value of the defective anode element based on the imaging mode selected by the user using the input interface.

2. The X-ray CT scanner according to claim 1, wherein the imaging mode includes a counting mode, and
   wherein the processing circuitry is further configured to add the output values of the plurality of normal elements for each of a plurality of energy bins over the plurality of energy bins and interpolate the output value of the defective anode element based on the added output values, when the counting mode is selected.

3. The X-ray CT scanner according to claim 2, wherein the processing circuitry is further configured to weight the output values of the normal elements based on energy values of the plurality of energy bins when the output values of the normal elements are added.

4. The X-ray CT scanner according to claim 3, wherein the processing circuitry is further configured to increase a weighting factor for the output values of the normal elements as the energy value of the corresponding energy bin increases.

5. The X-ray CT scanner according to claim 2, wherein the processing circuitry is further configured to weight the output values of the normal elements based on distances of the normal elements from the defective anode element when the output values of the normal elements are added.

6. The X-ray CT scanner according to claim 5, wherein the processing circuitry is further configured to increase a weight factor for the output values of the normal elements as the distances decrease.

7. The X-ray CT scanner according to claim 1, wherein the imaging mode includes a material discrimination mode, and
   wherein the processing circuitry is further configured to interpolate the output value of the defective anode element based on the output values of the plurality of normal elements for each of a plurality of energy bins, when the material discrimination mode is selected.

8. The X-ray CT scanner according to claim 7, wherein the processing circuitry is further configured to add the output values of the plurality of normal elements for a target energy bin and interpolate the output value of the defective anode element for the target energy bin based on the added output values.

9. The X-ray CT scanner according to claim 8, wherein the processing circuitry is further configured to weight the output values of the normal elements based on distances of the normal elements from the defective anode element when the output values of the normal elements are added.

10. The X-ray CT scanner according to claim 9, wherein the processing circuitry is further configured to increase a weight factor for the output values of the normal elements as the distances decrease.

11. A data acquisition system that collects count data indicating a counted number of X-ray photons for a plurality of energy bins and output from a photon counting detector including a plurality of anode elements, the data acquisition system comprising:
    an input interface configured to allow a user to select an imaging mode; and
    processing circuitry configured to:
       determine whether there is a defective anode element out of the plurality of anode elements; and
       interpolate an output value of the defective anode element based on output values of a plurality of normal elements that are included in the plurality of detection elements and adjacent to the defective anode element, when determining that there is the defective anode element,
    wherein the processing circuitry is further configured to interpolate the output value of the defective anode element based on the imaging mode selected by the user using the input interface.

12. A data acquisition method using an X-ray CT scanner including an input interface configured to allow a user to select an imaging mode and a photon counting detector including a plurality of anode elements, the data acquisition method comprising:
    determining whether there is a defective anode element out of the plurality of anode elements;
    interpolating an output value of the defective anode element based on output values of a plurality of normal elements which that are included in the plurality of anode elements and adjacent to the defective element, when determining that there is the defective anode element; and
    interpolating the output value of the defective anode element based on the imaging mode selected by the user using the input interface.

13. An X-ray CT scanner, comprising:
    a photon counting detector including a plurality of anode elements; and
    processing circuitry configured to
       determine whether there is a defective element out of the plurality of anode elements,
       interpolate an output value of the defective element based on output values of a plurality of normal elements that are included in the plurality of anode elements and adjacent to the defective element, when determining that there is the defective element,
       add the output values of the plurality of normal elements for each of a plurality of energy bins over the plurality of energy bins, and interpolate the output value of the defective element based on the added output values, when an imaging mode is a counting mode, and
       interpolate the output value of the defective element based on the output values of the plurality of normal elements for each of a plurality of energy bins, when the imaging mode is a material discrimination mode.

\* \* \* \* \*